United States Patent [19]

Bingham

[11] 3,860,084

[45] Jan. 14, 1975

[54] GAS CUSHION VEHICLE

[75] Inventor: Alan Edgar Bingham, Southampton, England

[73] Assignee: Vosper Thornycroft Limited, Portsmouth, England

[22] Filed: Aug. 31, 1973

[21] Appl. No.: 393,306

[30] Foreign Application Priority Data
Jan. 12, 1973   Great Britain ................. 1729/73

[52] U.S. Cl. ............................................. 180/117
[51] Int. Cl. .............................................. B60r 1/06
[58] Field of Search.... 180/116, 117, 126, 118–122, 180/1 P, 7 P; 114/67 A; 244/23 R, 23 C; 115/1 C

[56] References Cited
UNITED STATES PATENTS
3,187,817   6/1965   Colley ............................. 180/117 X
3,662,852   5/1972   Taylor .............................. 180/117

FOREIGN PATENTS OR APPLICATIONS
1,238,539   7/1971   Great Britain .................... 180/117

Primary Examiner—Lloyd L. King
Assistant Examiner—Gene A. Church
Attorney, Agent, or Firm—Norris & Bateman

[57] ABSTRACT

A gas cushion vehicle of the kind propelled by air propulsion means which is preferably a propellor or fan coupled to a main power unit to which is also coupled one or more lift fans for maintaining the gas cushion, the coupling of the propulsion means and the lift fan power unit being through a gear box so arranged that the drive from the gear box to air propulsion means is inclined to the horizontal, the vehicle having the propulsion means mounted so as to provide a low aspect ratio.

7 Claims, 2 Drawing Figures

PATENTED JAN 14 1975　　　　　　　　　　　　3,860,084
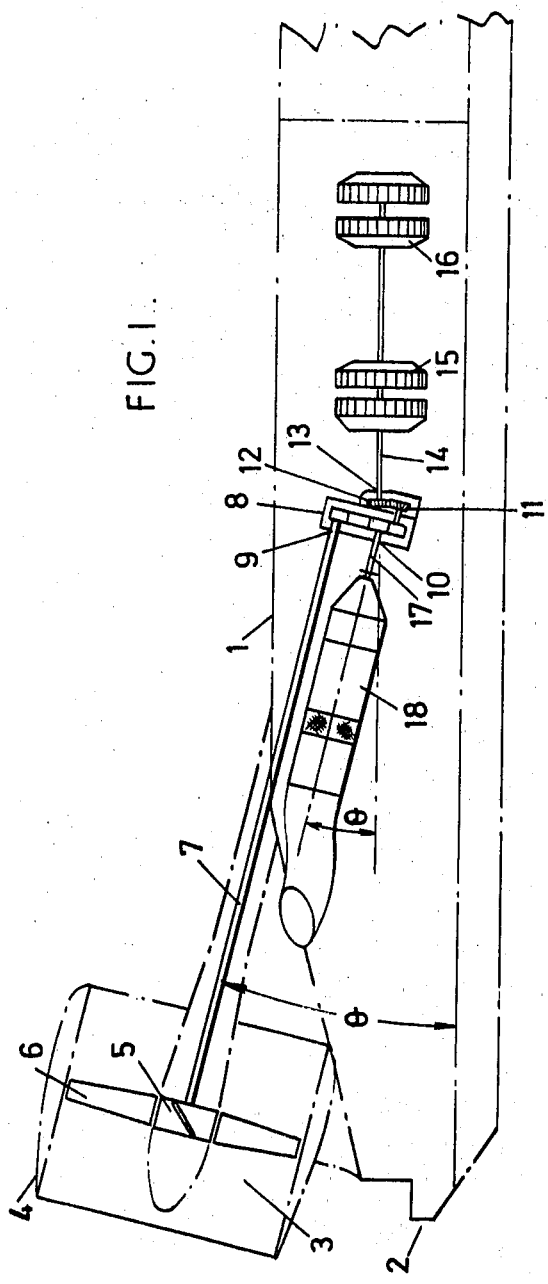
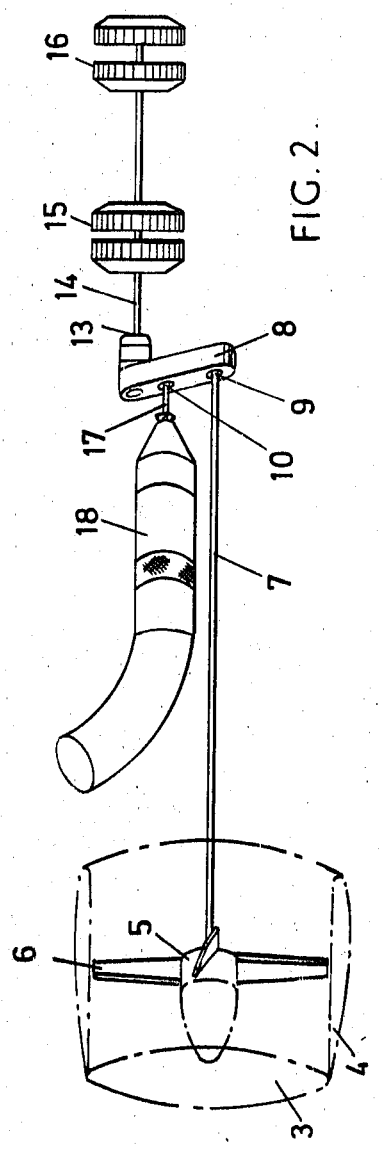

GAS CUSHION VEHICLE

The present invention relates to a gas cushion vehicle propelled by an air propulsion means which may be a screw or axial fan.

A well known feature of vehicles of this type is the mounting of the propulsion means which is usually an air-screw, on a pylon. This type of mounting is necessitated by the requirement to give the airscrew clearance from the upper bodywork of the vehicle. A further type of mounting for an airscrew is used in another craft where height above the bodywork is achieved by mounting the screw in an upwardly projecting dorsal nacelle at the rear of the vehicle.

Both these representative types of vehicle have the common features that firstly the airscrew propulsion shaft is mounted horizontally in order to achieve optimum thrust for the airscrew and secondly the propulsion shaft is by the elevated position of mounting, connected to the air cushion lift fan or fans and power plant by a system of bevel gearing involving at least one 90° change of direction of propulsion shafting.

A first disadvantage of these arrangements is that the height between the centre of propulsion and the level centre of drag of the vehicle which is near the water line, is such that a couple is produced which is of such significant moment that means must be provided to counteract this couple. Variation of thrust, however, will still result in pitch changes of the craft attitude and would accentuate irreversible characteristics such as "plough in." A second disadvantage is that 90° changes in direction of the shafting may involve gear boxes in addition to the reduction gear box of the power unit. Further complication in such an arrangement arises when these gear boxes have to be lubricated and inspection or maintenance has to be carried out. A further disadvantage is that the high overall height of the vehicle governed by the high mounting of the propulsion means may be disadvantageous when considering a military application of the vehicle where a low profile may assist in avoiding visual or radar detection.

In further vehicles the drive shaft to the propulsion means is an inclined shaft having universal couplings incorporated. This arrangement is clearly disadvantageous in that wear can occur in such couplings. Furthermore, there are practical limitations in the amount of power that can be transmitted, and in the maximum angle that can be used.

An object of the invention is therefore to reduce the above disadvantages by providing a gas cushion vehicle comprising in combination a hull in which is mounted the power plant, a gear box having an input from the power plant, the gear box having a first output inclined to a horizontal, which output is directly connected to propulsion means, and the gear box having a second output directly connected to one or more lift fans, wherein the propulsion means comprises a rotor having a rotor axis coaxial with the first output from the gear box. By horizontal is meant the horizontal in relation to the craft when the craft is in its mean operating attitude. A craft may have one or more such integrated lift/propulsion systems.

The advantages of such a simplified arrangement achieved by inclining the propulsion means rotor axis or axes is that a single gear box can be provided in a machinery compartment with ready access to maintenance and that most of the heavier parts of the machinery of a gas cushion vehicle according to the invention can be located low down in the craft. In certain circumstances the gear box can also, beside providing very convenient arrangement for the transfer of power from the power plant direct to the propulsion means and lift fan, provide a convenient location for variable rotor blade pitch mechanisms which mechanisms transmit pitch change by means of a small shaft mounted within a drive shaft between the propulsion means and the gear box. This arrangement for providing most of the variable pitch mechanism within the gear box also allows for reduction of top weight, easy maintenance and compactness of machinery.

Further advantages of the gas cushion vehicle according to the invention may be obtained by the low mounting of the propulsion means enabling an airscrew or ducted fan of large diameter to be used and thereby reducing the fan blade tip speeds which will result in a noise output being reduced.

The embodiments of the invention will now be described, by way of example, with reference to the accompanying drawings wherein FIG. 1 is a diagrammatic side elevation of part of a gas cushion vehicle according to the invention showing one integrated lift/propulsion machinery installation, FIG. 2 a plan view of the port machinery installation of the vehicle shown in FIG. 1, the vehicle having two propulsion fans and two turbines.

In the drawings which show a gas cushion vehicle the upper bodywork of the vehicle is shown by the line 1 and the rear of the craft is at 2. Above the rear of the craft is mounted a propulsion means comprising a propulsion fan 3 mounted in a fan duct 4 which is inclined at an angle $\theta$ to the horizontal. The fan 3 generally comprising a rotor has a hub 5 and fan blades 6. From the hub extends a drive shaft 7 at an inclination of $\theta$ to the horizontal downward to a gear box 8 and connected to a gear box first output 9. Within the gear box 8 the first output 9 is connected via spur gears to an input 10 and two shallow bevel gears 11 and 12 from which bevel gear 12 is taken a second output 13. Connected to the second output 13 is a horizontal drive shaft 14 connected to two sets of centrifugal lift fans 15 and 16. Connected to the gear box input 10 is the output shaft 17 of a power plant which is in this case a gas turbine 18.

In the embodiment shown an angle of inclination $\theta$ of the propulsion means is approximately 10° but this can be varied between 5° and 45° depending on the size of craft and required configuration.

In the embodiment shown in the drawings and described the transmission from the power plant to the lift fans and propulsion means is permanently connected during operation. It will be observed in the drawings that the output shaft 17 of the turbine 18 is parallel to the shaft 7 from the first output 9 of the gear box 8 to the propulsion means hub 5. The shaft 7 carried a larger proportion of the power transmitted from the shaft 10 than the shaft 14 transmitting power to the lift fans 15 and 16. It will be further observed that a train of spur gearwheels is used to transfer this larger proportion of the power from shaft 10 to shaft 7. The arrangement of the embodiment is such that the lift fans 15 and 16, gear box 8 and power plant turbine 18 power all enclosed within the body 1 of the vehicle and the propulsion means 3 is exposed.

In the embodiment described the ratio of speeds between shafts 17, 7 and 14 power is approximately 15—7-12.

In a second embodiment which is not shown the axis of the power plant output shaft is aligned parallel to the drive to the lift fans and the propulsion means is driven via a shallow angle bevel gear arrangement so that the drive to the propulsion means is inclined to the axis of the output of the power plant.

In a further embodiment which is not shown, more than two turbines are coupled to the or each propulsion means.

I claim:

1. A gas cushion vehicle comprising in combination a hull in which is mounted a power plant, at least one lift fan and propulsion means for the vehicle, a gear box having an input from the power plant, the gear box having a first output inclined to the horizontal, which output is directly connected to said propulsion means, and the gear box having a second output directly connected to said lift fan. and said propulsion means comprising a rotor having a rotor axis coaxial with the first output from the gear box.

2. A gas cushion vehicle as claimed in claim 1 wherein the angle of inclination of the gear box first output to the horizontal is between 5° and 45°.

3. A gas cushion vehicle as claimed in claim 1 wherein the power plant has an output shaft connected directly to the gear box input, and a drive shaft extends from the gear box first output to the propulsion means, said power plant output shaft being substantially parallel to said drive shaft.

4. A gas cushion vehicle as claimed in claim 1 wherein the power plant has an output shaft connected directly to said gear box and a drive shaft parallel to said power plant output shaft connects the second gear box output to the fan.

5. A gear cushion vehicle as claimed in claim 3 wherein the gear box first output is connected to the gear box input by means of spur gears and the gear box second output is connected to the gear box input by means of shallow bevel gears.

6. A gas cushion vehicle as claimed in claim 1 wherein the power plant comprises at least one turbine.

7. A gas cushion vehicle as claimed in claim 1 wherein two rotors are provided in said propulsion means.

* * * * *